A. SCHAEFER.
RIDGING AND PULVERIZING MACHINE.
APPLICATION FILED FEB. 26, 1918.
1,265,526.
Patented May 7, 1918.
FIG_1_
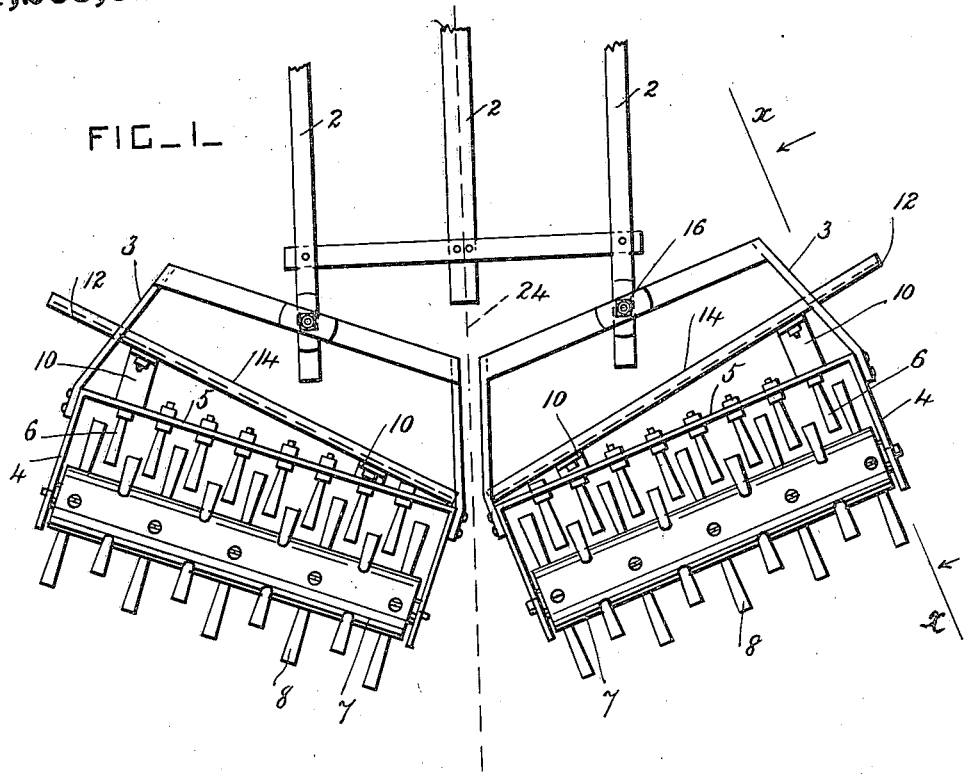
FIG_2_
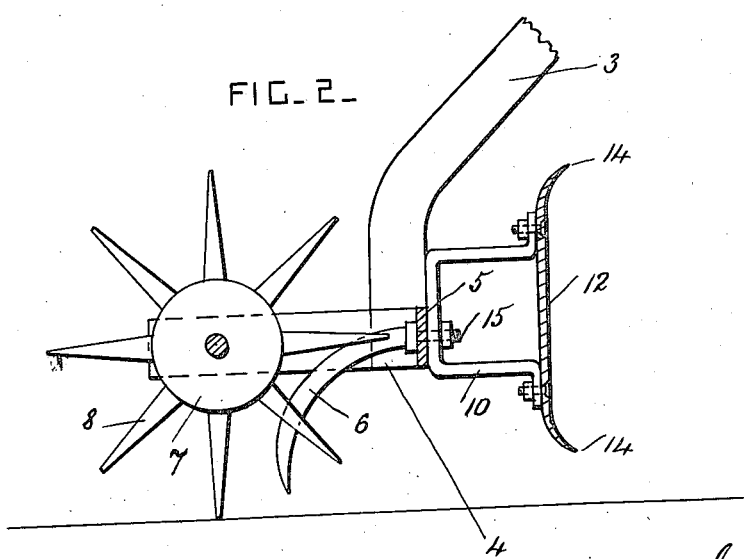
Inventor.
Anton Schaefer
by Herbert W. ...
Attorney.

UNITED STATES PATENT OFFICE.

ANTON SCHAEFER, OF SPRING GROVE, ILLINOIS.

RIDGING AND PULVERIZING MACHINE.

1,265,526.　　Specification of Letters Patent.　　Patented May 7, 1918.

Application filed February 26, 1918. Serial No. 219,241.

*To all whom it may concern:*

Be it known that I, ANTON SCHAEFER, a citizen of the United States, residing at Spring Grove, in the county of McHenry and State of Illinois, have invented certain new and useful Improvements in Ridging and Pulverizing Machines, of which the following is a specification.

This invention relates to machines for ridging rows of corn and pulverizing the ridged surfaces simultaneously; and it consists in the novel construction and combination of the parts hereinafter fully described and claimed.

In the drawings, Figure 1 is a plan view of a ridging and pulverizing machine constructed according to this invention. Fig. 2 is a cross-section, taken on the line $x$—$x$ in Fig. 1.

A draft device 2 of any approved construction is provided, and this draft device may be the draft pole or the shovel beams of a cultivator or other similar agricultural implement of any suitable sort, and which is not shown as it is not a necessary part of the present invention. The machine of the present invention may advantageously be used together with a cultivator, but it can also be used separately.

Forked uprights 3 are provided and are secured at their middle parts to the beams 2 which form the draft device. The end portions of these uprights project downwardly, and a similar frame 4 is rigidly secured to each end portion. The two frames are arranged with their adjacent ends near the center line of draft shown by the dotted line 24.

The front bars 5 of these frames project forwardly of their rear ends so that the bars 5 form suitable angles with the center line of draft 24. Each bar 5 is provided with a row of harrow teeth 6 which project downwardly and rearwardly from it. A similar roller or cylinder 7 is journaled in each frame, and each roller has a series of teeth 8 which project from it, and which work between the stationary teeth 6.

The axis of each roller is arranged at an angle to the center line of draft 24, and this angle is selected and arranged so that the combined action of the toothed rollers and the stationary teeth will pulverize and harrow the ground to the best advantage as the machine is drawn along.

Brackets 10 are secured to the front sides of the frame bars 5, and 12 are ridging blades which are secured to the brackets 10. These blades 12 are arranged at a more acute angle with the center line of draft 24, than the axes of the toothed rollers, as that enables them to work to better advantage.

The cutting and scraping edges 14 of the blades 12 are curved forwardly a little, and the blades are reversible, being provided with a scraping edge at both top and bottom. The bolts 15 which secure the brackets 10 to the frames are placed at unequal distances from the scraping edges so that the blades can be reversed to enable them to scrape the soil at different distances above the points of the stationary harrow teeth 6.

The blades and the frames 4 can be set at any desired angle with the horizontal to enable them to scrape the soil upwardly and pile it at the bottoms of the corn stalks, but in the drawings this inclination is not shown, the parts being shown in their positions when horizontal and before the adjustment is effected. The adjustment can be made in any approved way, for instance, by tilting the uprights on their fastening bolts 16 which secure them to the draft device.
The ridges for the corn do not require to be very steep, and the ridging effect can also be obtained by varying the shape of the blades and the length of the harrow teeth.

The blades scrape the soil into ridges, and the harrow teeth which follow them in operation pulverize the soil and harrow it, so that its surface is left in a loose condition, and clear of weeds, and so that moisture can penetrate it easily.

What I claim is:

1. In a ridging and pulverizing machine, a draft device, two frames secured to the draft device, harrow teeth carried by the said frames, toothed rollers journaled in the said frames behind the harrow teeth and arranged one on each side of and at a predetermined angle to the center line of draft, and ridging blades secured to the frames in front of the harrow teeth and arranged at a different predetermined angle from the toothed rollers.

2. In a ridging and pulverizing machine, a draft device, two frames secured to the draft device, harrow teeth carried by the said frames, toothed pulverizing rollers mounted in the said frames behind the harrow teeth and arranged one on each side of and at an angle to the center line of draft, and ridging blades secured to the frames in front of the harrow teeth.

3. In a ridging and pulverizing machine, a draft device, two frames secured to the draft device, harrow teeth carried by the said frames, toothed pulverizing rollers mounted in the said frames behind the harrow teeth and arranged one on each side of and at an angle to the center line of draft, reversible ridging blades having scraping edges at top and bottom, and means for securing the ridging blades to the frames in front of the harrow teeth at different distances above their points.

In testimony whereof I have affixed my signature.

ANTON SCHAEFER.